United States Patent
Lee et al.

(10) Patent No.: US 10,328,373 B2
(45) Date of Patent: Jun. 25, 2019

(54) AIR CONDITIONING APPARATUS

(71) Applicant: LG ELECTRONICS INC., Seoul (KR)

(72) Inventors: Yanghwa Lee, Seoul (KR); Chulwoo Park, Seoul (KR); Hojung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 220 days.

(21) Appl. No.: 15/113,768

(22) PCT Filed: Dec. 31, 2014

(86) PCT No.: PCT/KR2014/013114
§ 371 (c)(1),
(2) Date: Jul. 22, 2016

(87) PCT Pub. No.: WO2015/111853
PCT Pub. Date: Jul. 30, 2015

(65) Prior Publication Data
US 2017/0007953 A1 Jan. 12, 2017

(30) Foreign Application Priority Data
Jan. 24, 2014 (KR) ........................ 10-2014-0008932

(51) Int. Cl.
*B01D 46/00* (2006.01)
*B03C 3/36* (2006.01)
(Continued)

(52) U.S. Cl.
CPC ............ *B01D 46/0078* (2013.01); *B03C 3/04* (2013.01); *B03C 3/12* (2013.01); *B03C 3/368* (2013.01);
(Continued)

(58) Field of Classification Search
CPC combination set(s) only.
See application file for complete search history.

(56) References Cited

U.S. PATENT DOCUMENTS 5,980,614 A * 11/1999 Loreth ...................... B03C 3/12
96/63
6,129,781 A * 10/2000 Okamoto .................. B03C 3/12
55/282.3
(Continued)

FOREIGN PATENT DOCUMENTS

| CN | 2490490 Y | 5/2002 |
| CN | 200967020 Y | 10/2007 |

(Continued)

*Primary Examiner* — Amber R Orlando
*Assistant Examiner* — Sonji Turner
(74) *Attorney, Agent, or Firm* — Dentons US LLP

(57) ABSTRACT

An air conditioning apparatus according to an aspect of the present invention includes a main body including a suction part through which air is suctioned and a discharge part through which the air suctioned through the suction part is discharged, a fan disposed in the main body to allow the air to flow, an electric charge device coupled to the main body outside the main body to charge dust in the air, and a filter device disposed between the suction part and the discharge part in the main body to collect the charged dust particles.

10 Claims, 5 Drawing Sheets

(51) Int. Cl.
| | |
|---|---|
| *B03C 3/38* | (2006.01) |
| *F24F 13/08* | (2006.01) |
| *B03C 3/51* | (2006.01) |
| *F24F 1/00* | (2019.01) |
| *F24F 13/28* | (2006.01) |
| *B03C 3/04* | (2006.01) |
| *B03C 3/41* | (2006.01) |
| *B03C 3/47* | (2006.01) |
| *B03C 3/12* | (2006.01) |
| *F24F 1/0007* | (2019.01) |
| *F24F 1/0057* | (2019.01) |
| *F24F 3/16* | (2006.01) |

(52) U.S. Cl.
CPC ............... *B03C 3/38* (2013.01); *B03C 3/41* (2013.01); *B03C 3/47* (2013.01); *B03C 3/51* (2013.01); *F24F 1/0007* (2013.01); *F24F 13/082* (2013.01); *F24F 13/28* (2013.01); *B03C 2201/28* (2013.01); *F24F 1/0057* (2019.02); *F24F 2001/0048* (2013.01); *F24F 2003/1635* (2013.01); *F24F 2003/1639* (2013.01)

(56) References Cited

U.S. PATENT DOCUMENTS

| | | | | |
|---|---|---|---|---|
| 7,065,978 | B2* | 6/2006 | Hong | F24F 1/0007 126/110 R |
| 7,238,225 | B2* | 7/2007 | Hong | B03C 3/47 96/69 |
| 7,258,730 | B2* | 8/2007 | Choi | B03C 3/41 95/73 |
| 7,350,371 | B2* | 4/2008 | Lee | F24F 1/0007 62/317 |
| 7,722,707 | B2* | 5/2010 | Tanaka | A61L 9/16 422/186.04 |
| 8,505,327 | B2* | 8/2013 | Son | F24F 1/0007 62/407 |
| 2003/0005824 | A1* | 1/2003 | Katou | B03C 3/12 96/35 |
| 2005/0284168 | A1 | 12/2005 | Lee et al. | |
| 2008/0028771 | A1* | 2/2008 | Nagae | F24F 1/0007 62/78 |
| 2010/0095848 | A1* | 4/2010 | Chang | B03C 1/0332 96/82 |

FOREIGN PATENT DOCUMENTS

| | | | | |
|---|---|---|---|---|
| CN | 102042641 A | 5/2011 | | |
| EP | 1905458 A2 * | 4/2008 | ............... | A61L 9/22 |
| JP | 60-235658 A | 11/1985 | | |
| JP | 8-243435 A | 9/1996 | | |
| JP | 9-327636 A | 12/1997 | | |
| JP | 2005-156092 A | 6/2005 | | |
| JP | 2011-85288 A | 4/2011 | | |
| WO | 95/19225 A1 | 7/1995 | | |
| WO | 2014/007558 A1 | 1/2014 | | |

\* cited by examiner

[Fig. 1]
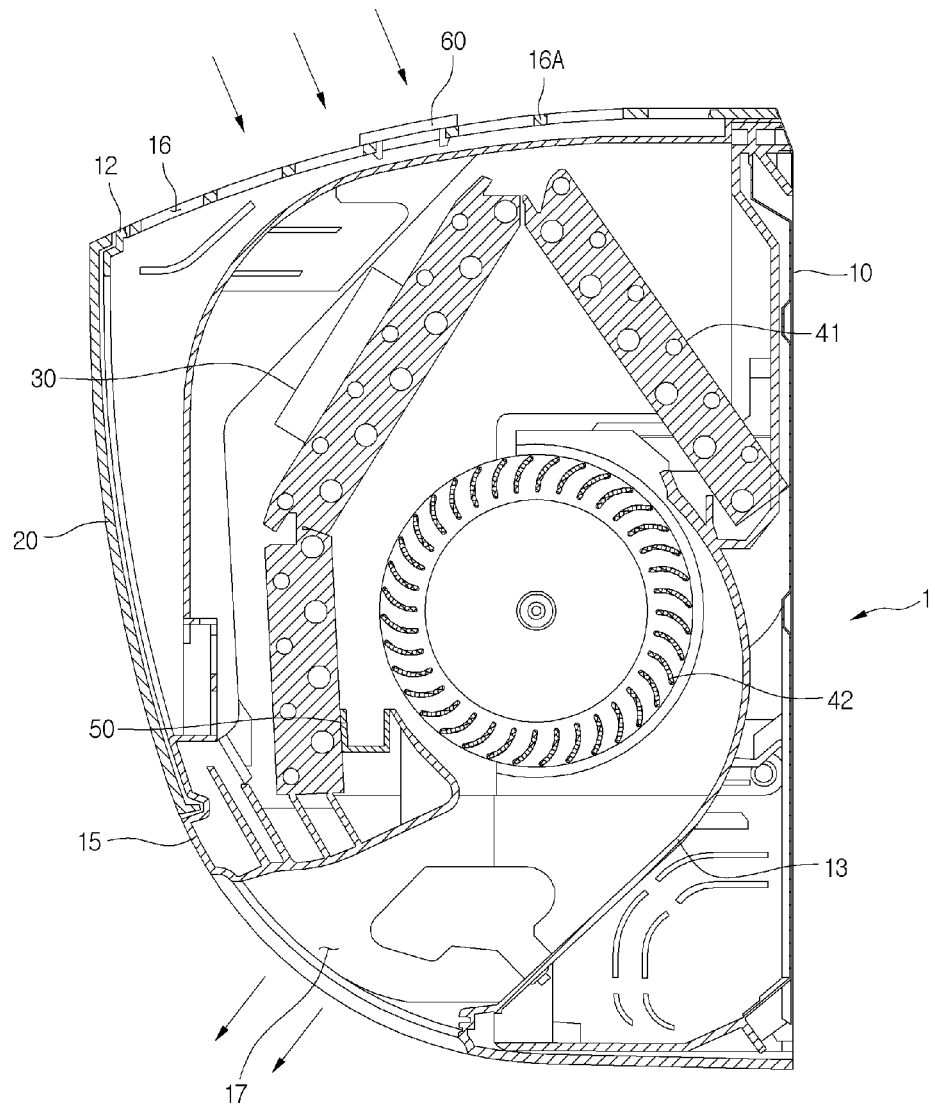

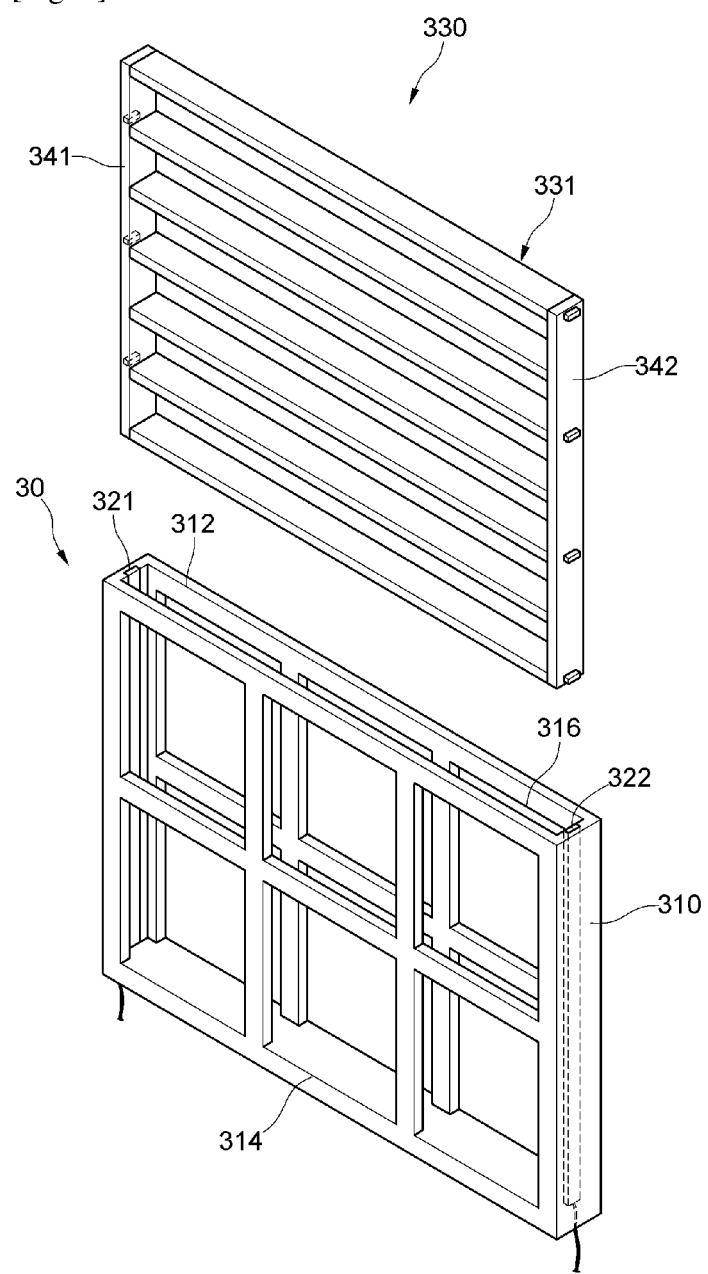
[Fig. 2]

[Fig. 3]
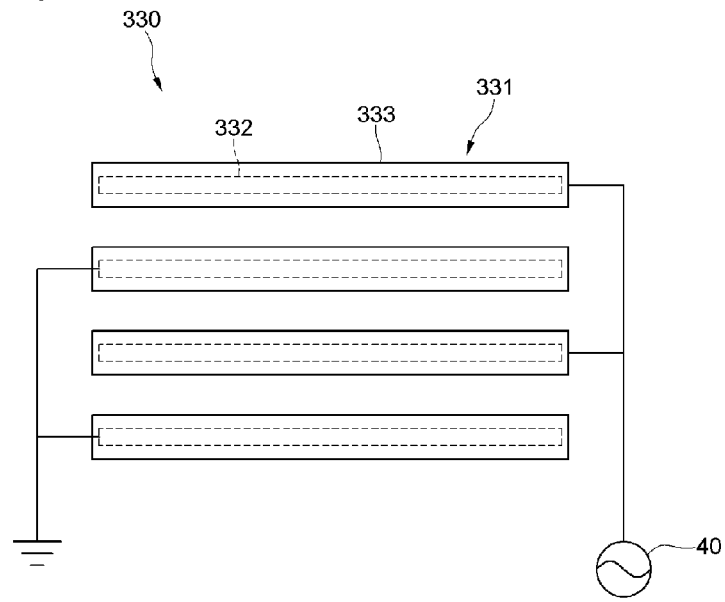
[Fig. 4]
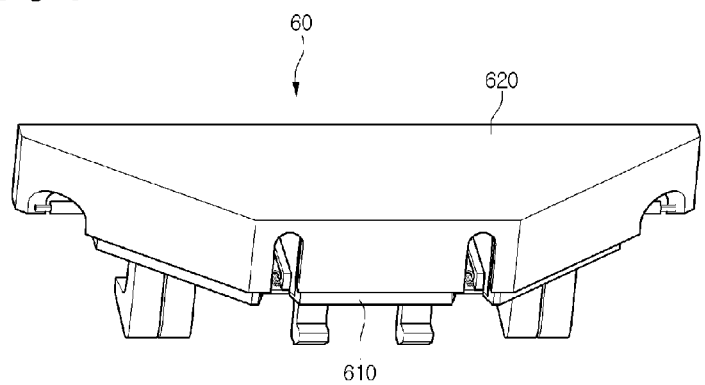
[Fig. 5]
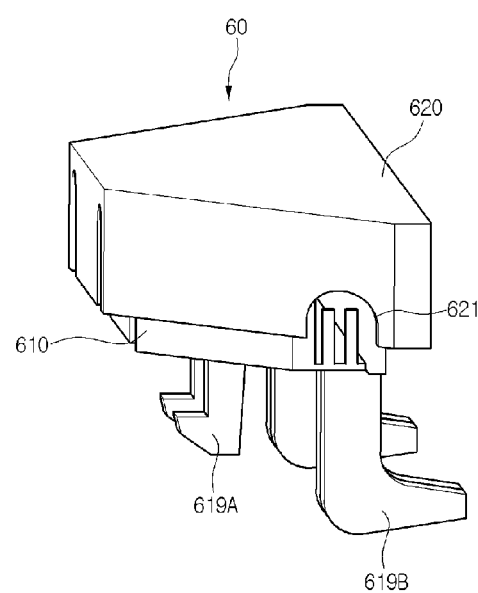

[Fig. 6]
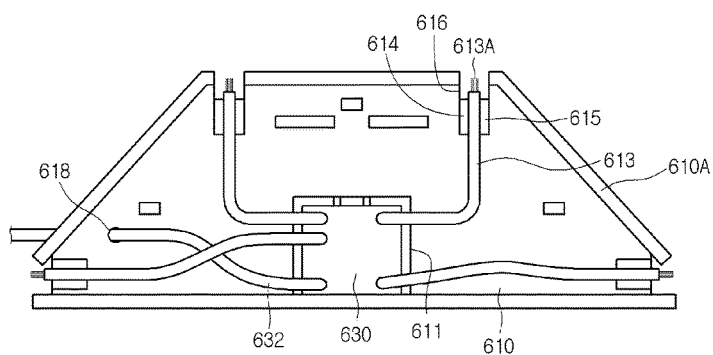
[Fig. 7]
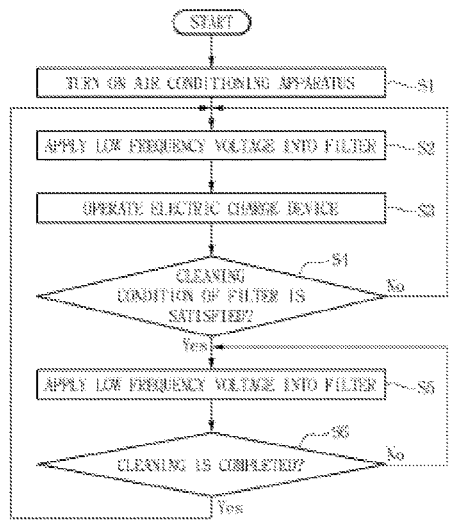

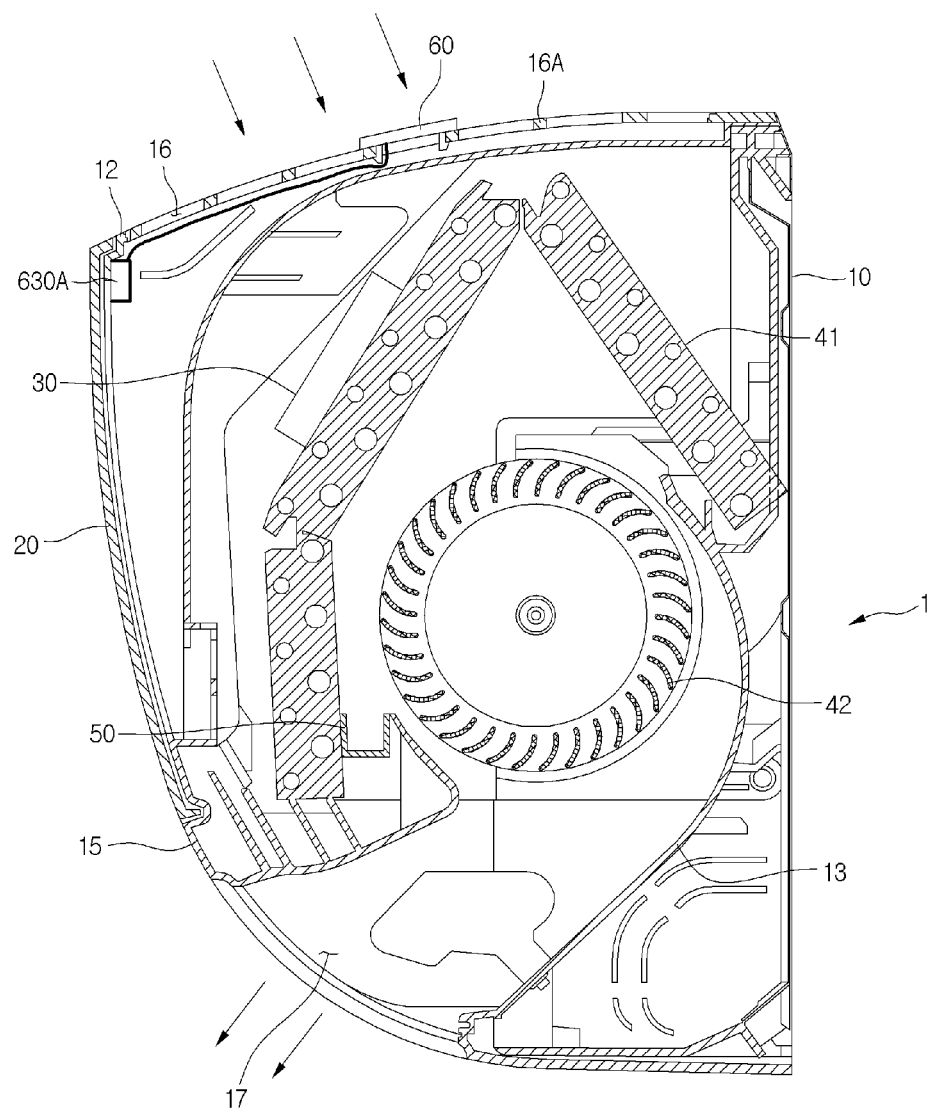
[Fig. 8]

AIR CONDITIONING APPARATUS

TECHNICAL FIELD

The present disclosure relates to an air conditioning apparatus.

BACKGROUND ART

In general, air conditioning apparatuses are apparatuses for cooling, heating or cleaning air.

The air conditioning apparatus may include an air conditioner as a cooling device for cooling an indoor space, a heat pump for heating the indoor space, and an air cleaner for cleaning indoor air.

A dust collector for an air conditioning apparatus is disclosed in Korean Patent Publication Gazette No. 2002-0043307 (Publication date: Jun. 10, 2002) that is a prior document.

The dust collector includes an ionizing part for ionizing impurities in air, a gold net disposed on a rear surface of the ionizing part to filter the impurities passing through the ionizing part, and a collection part charging the fine impurities passing through the gold net so that the impurities have opposite polarity to absorb the charged fine impurities through an electrostatic force.

According to the dust collector according to the related art, since the ionizing part is disposed at a rear side of a suction part in the air conditioning apparatus, only a portion of the air passes through the ionizing part, and thus air cleaning performance is deteriorated. Also, the ionizing part itself acts as flow resistance against the air. Also, the ionizing part is disposed in the air conditioning apparatus to decrease space occupancy efficiency in the air conditioning apparatus. If the ionizing part increases in size, the air conditioning apparatus also increases in size.

DISCLOSURE OF INVENTION

Technical Problem

Embodiments provide an air conditioning apparatus having improved air conditioning performance.

Solution to Problem

In one embodiment, an air conditioning apparatus comprises: a main body including a suction part through which air is suctioned and a discharge part through which the air suctioned through the suction part is discharged; a fan disposed in the main body to allow the air to flow; an electric charge device coupled to the main body outside the main body to charge dust in the air; and a filter device disposed between the suction part and the discharge part in the main body to collect the charged dust particles.

The main body may include a suction grill defining the suction part, and the electric charge device is coupled to the suction grill.

The electric charge device may include: an electric charge part having at least one electrode; a base on which the electric charge part is seated, the base being coupled to the main body; and a cover for covering the base.

A position fixing part for fixing a position of the electric charge part may be disposed on the base or the cover.

An exposing part allowing the electrode of the electric charge part to be exposed to the outside may be defined in one of the base and the cover.

A voltage applying part for applying a voltage into the electrode of the electric charge part may be disposed between the base and the cover.

A wire through-hole through which a wire connected to the voltage applying part passes may be defined in the base.

A seating guide for guiding a seated position of the voltage applying part may be disposed on the base or the cover.

The air conditioning apparatus may further include a voltage applying part disposed in the main body to apply a voltage into the electrode of the electric charge part.

A plurality of coupling parts coupled to the main body may be disposed on the base.

The filter device may include at least one conductive member for collecting the discharged dust particles.

The at least one conductive member may contact a dielectric.

The air conditioning apparatus may further include a power source supply part connected to the conductive member, wherein the power source supply part may supply a voltage having a first frequency while the air conditioning apparatus operates, and when it is determined that the filter device needs to be cleaned, the power source supply part applies a voltage having a second frequency that is higher than the first frequency into the at least one conductive member.

The fan may be stopped while the power source supply part applies the voltage having the second frequency that is higher than the first frequency into the at least one conductive member.

When it is determined that the filter device needs to be cleaned in a state where the fan rotates while the air conditioning apparatus operates, the power supply part may apply the voltage having the second frequency that is higher than the first frequency into the at least one conductive member, and the fan is reduced in rotation rate.

Advantageous Effects of Invention

According to the embodiments, since the electric charge part is disposed outside the main body, the amount of the charged dust may be maximized to maximize the air conditioning performance.

Also, since the dust particles are separated from the filter by the dielectric barrier discharge to collect the dust particles into the dust storage part without separating the filter from the main body to clean the filter by a user, the user convenience may be improved.

Also, since the dust particles separated from the filter are stored in the dust storage part, the discharge of the dust particles to the outside of the main body may be minimized.

BRIEF DESCRIPTION OF DRAWINGS

FIG. 1 is a schematic view of an air conditioning apparatus according to an embodiment.

FIG. 2 is an exploded perspective view of a filter device according to an embodiment.

FIG. 3 is a schematic view of a filter according to an embodiment.

FIGS. 4 and 5 are perspective views of an electric charge device according to an embodiment.

FIG. 6 is a view illustrating a state where a cover is separated constituting the electric charge device according to an embodiment.

FIG. 7 is a flowchart illustrating a method of controlling the air conditioning apparatus according to an embodiment.

FIG. 8 is a schematic view of an air conditioning apparatus according to another embodiment.

MODE FOR THE INVENTION

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense.

Also, in the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

The air conditioning apparatus in the present disclosure may be comprehensive apparatuses including an air conditioner as a cooling device for cooling an indoor space, a heat pump for heating the indoor space, and an air cleaner for cleaning indoor air. Thus, the air conditioning apparatus in the present disclosure may include any products as long as the apparatuses change a state of flowing air.

FIG. 1 is a schematic view of an air conditioning apparatus according to an embodiment.

The air conditioning apparatus 1 according to an embodiment may includes an indoor unit and an outdoor unit. The indoor unit is illustrated in FIG. 1.

Referring to FIG. 1, the air conditioning apparatus 1 may include a main body 10 in which a plurality of components are accommodated therein.

The main body 10 may include a front frame 12 defining an outer appearance of the main body 10 and a rear frame 13. In a state where the front frame 12 and the rear frame 13 are coupled to each other, a space in which various components such as an indoor heat exchanger 41 and a fan 42 that will be described later are disposed may be defined between the front frame 12 and the rear frame 13.

In the current embodiment, the frame defining the outer appearance of the main body 10 is not limited to a shape and number thereof.

The main body 10 may further include a front panel 20 disposed on a front surface of the front frame 12 to defining a front outer appearance of the main body 10. Here, the front panel 20 may be rotatably coupled to the front frame 12.

The main body 10 may further include a suction grill 16A defining a suction part 16 through which indoor air is suctioned and a discharge part 17 through which the suctioned indoor air is discharged into an indoor space.

The suction grill 16A may be defined in an upper portion of the main body 10, substantially, in an upper portion of the front frame 12. The discharge part 17 may be defined in front and bottom surfaces of the main body 10. However, in the current disclosure, each of the suction part 16 and the discharge part 17 is not limited to a position thereof.

The main body 10 may further include a filter device 30 for filtering the air suctioned through the suction part 16, the indoor heat exchanger 41 in which the indoor air is heat exchanged with a refrigerant, a fan 42 for forcibly flowing the indoor air, and an electric charge device 60 for charging dust in the air.

Also, the main body 10 may further include a discharge grill part 15 for guiding discharge of the indoor air that is heat exchanged with the refrigerant.

A portion of or whole indoor heat exchanger 41 may be inclindely disposed in the main body 10. The indoor heat exchanger 41 may have a structure in which a plurality of heat exchanger are connected to each other, or a single heat exchanger is bent several times.

The filter device 30 may be disposed between the suction part 16 and the indoor heat exchanger 41 to collect dust, thereby removing dust in the air. For example, the filter device 30 may be disposed in the indoor heat exchanger 41. Alternatively, the filter device 30 may be disposed on one surface of the front frame 12 in which the suction part 16 is defined inside the main body 10.

For example, although the filter device 30 may be coupled to the indoor heat exchanger 41 or the front frame 12 in a hook manner, in the present disclosure, the coupling structure of the filter device 30 is not limited.

The discharge grill part 15 may support the indoor heat exchanger 41. A dust storage part 50 for collecting dust particles removed from the filter device 30 may be coupled to the discharge grill part 15. Alternatively, the discharge grill part 15 may define the dust storage part 50. Alternatively, the dust storage part 50 may he coupled to the indoor heat exchanger 41 at an upstream side or downstream side of the indoor heat exchanger 41 with respect to a flow of the air. For example, the dust storage part 50 may be coupled to the indoor heat exchanger 41 by a hook.

The dust storage part 50 may be disposed at a lower side of the filter device 30 so as to collect the dust removed from the filter device 30 therein. Although it will be described later, the dust in the air may be collected in the filter device 30, and the dust collected in the filter device 30 may be separated from the filter device 30. Also, the dust separated from the filter device 30 may be stored in the dust storage part 50.

As another example, the dust storage part 50 may be coupled to a lower portion of the filter device 30, or a portion of the filter device 30 may defined the dust storage part 50.

The electric charge device 60 may charge the dust in the air so that an amount of dust collected in the filter device 30 increases. The electric charge device 60 may be separably connected to the suction grill 16A at the outside of the main body 10.

Since the indoor air is suctioned into the main body 10 through the suction part 16 defined in the suction grill 16A, when the electric charge device 60 is disposed outside the main body 10, the amount of the charged dust in the air may be maximized.

Also, since the electric charge device 60 is disposed outside the main body 10, a space occupancy in the main body 10 may increase, and thus the electric charge device 60 may be changed in position depending on an installation position of the main body Hereinafter, the filter device 30 will be described in detail.

FIG. 2 is an exploded perspective view of a filter device according to an embodiment, and FIG. 3 is a schematic view of a filter according to an embodiment.

Referring to FIGS. 2 and 3, the filter device 30 may include a filter 330 and a filter housing 310 for supporting the filter 330.

The filter 330 may include a plurality of arrays 331 spaced apart from each other. Since the plurality of arrays 331 are spaced apart from each other, the air may pass through between the plurality of arrays 331.

Each of the plurality of arrays 331 may include a conductive member 332 and a dielectric layer 333 in which a dielectric material is applied on an outer surface of the conductive member 332.

The conductive member 332 may include carbon, carbon nanotube, or conductive polymer. For example, the conductive polymer may include poly(3,4-ethylenedioxythiophene) (PEDOT) or polypyrrole.

A 2n-th array of the plurality of arrays 331 may be connected to a power source supply part 40, and a 2n+1-th array of the plurality of arrays 331 may be grounded.

The power source supply part 40 may supply an alternating current (AC) voltage or a direct current (DC) voltage. When the AC or DC voltage is supplied from the power source supply part 40 to the filter 330, plasma discharge may occur between the plurality of arrays 331. Then, the dust particles flowing between the plurality of arrays 331 may be attached to the dielectric layer 333 of each of the plurality of arrays 331, thereby cleaning the air. That is, the air may be cleaned by dielectric barrier discharge.

Both ends of the conductive member 332 of each of the plurality of arrays 331 are exposed to the outside. Support frames 341 and 342 are coupled to both sides of the array 331. Also, the both ends of the conductive member 332 may mass through the support frames 341 and 342.

The filter housing 310 includes an accommodation part 312 for accommodating the filter 330. Also, the filter housing 310 includes air hole 314 for allowing the air to pass through the filter housing 310.

A first conductive plate 321 for contacting the conductive member 332 of the 2n-th array of the filter 330 and a second conductive plate 322 for contacting the conductive member 332 of the 2n+1-th array of the filter 330 may be disposed in the filter housing 310. Also, the first conductive plate 321 is grounded, and the second conductive plate 322 is connected to the power source supply part 40.

The power source supply part 40 may apply a low frequency voltage or a high frequency voltage into the filter 330. That is, in the current embodiment, the frequency of the voltage applied into the filter 330 may be changed.

The power source supply part 40 may apply the high frequency voltage into the filter 330 when it is determined that the filter 330 needs to be cleaned while applying the low frequency voltage into the filter 330.

Hereinafter, the electric charge device 60 will be described in detail.

FIGS. 4 and 5 are perspective views of an electric charge device according to an embodiment, and FIG. 6 is a view illustrating a state where a cover is separated constituting the electric charge device according to an embodiment.

Referring to FIGS. 4 to 6, the electric charge device 60 may include a base 610 coupled to the suction grill 16A, a cover 620 coupled to the base 610, and one or more electric charge parts 613 disposed between the base 610 and the cover 620.

The electric charge device 60 may further include a voltage applying part 630 disposed between the base 610 and the cover 620 and connected to the electric charge part 613 to apply a voltage into the electric charge part 613.

The voltage applying part 630 may be seated on the base 610. A seating guide 611 for guiding a seated position of the voltage applying part 630 may be disposed on the base 610. A movement of the voltage applying part 630 may be prevented in a state where the voltage applying part 630 is seated on the seating guide 611. As another example, the seating guide 611 may be disposed on the cover 620.

The plurality of electric charge parts 613 may be connected to the voltage applying part 630 so as to increase the amount of the charged dust. Each of the electric charge parts 613 may include one or a plurality of carbon fiber electrodes 613A (hereinafter, referred to as an "electrode"). Although not limited, the carbon fiber electrode may have a diameter in a range of about 6.7 µm to about 7.8 µm.

The plurality of electric charge parts 613 may be connected to the voltage applying part 630 in a state where the plurality of electric charge parts 613 are horizontally spaced apart from each other. Also, a position fixing part for fixing positions of the plurality of electric charge parts 613 that are spaced apart from each other may be disposed on the base 610. The position fixing part may include a first rib 614 and a second rib 615 which are spaced a predetermined distance apart from each other.

The first and second ribs 614 and 615 may protrude from the base 610. Here, each of the electric charge parts 613 may be disposed between the first rib 614 and the second rib 615. The state in which the plurality of electric charge parts 613 are spaced apart from each other may be maintained by the position fixing part. As another example, the position fixing part may be disposed on the cover.

The base 610 includes a sidewall 610A. An exposure art 616 for allowing the one or more electrodes 613A of each of the electric charge parts 613 to contact the air or dust is defined in the sidewall 610A. The exposing part 616 may be a groove, a hole, or a cutoff portion.

Also, a wire through-hole 618 through which a wire 632 connected to the voltage applying part 630 passes may be defined in the base 610.

A plurality of coupling parts 619A and 619B for fixing the base 610 to the suction grill 16A may be disposed on the base 610. Although, for example the plurality of coupling parts 619A and 619B may be a hook, it is not limited thereto.

An exposing part 621 for allowing the one or more electrodes 613A of the electric charge part 613 to contact the air or dust may be also defined in the cover 620. Of course, the exposing part may be defined in any one of the base and the cover.

Although the cover 620 is coupled to the base 610 by using the hook or a screw, the present disclosure is not limited thereto. For example, the present disclosure is not limited to the coupling method between the cover 620 and the base 610.

FIG. 7 is a flowchart illustrating a method of controlling the air conditioning apparatus according to an embodiment.

Referring to FIG. 7, the air conditioning apparatus 1 is turned on to operate. Then, the fan 42 rotates to allow the indoor air to be suctioned into the main body 10 through the suction part 16. In operation S2, the low frequency DC voltage or AC voltage is supplied into the filter 330. Also, in operation S3, the electric charge device 60 operates.

When the electric charge device 60 operates, a high voltage is applied from the voltage applying part 630 into the electric part 613. Then, ions may be generated from an end of the electrode 613A of the electric charge part 613 to charge the dust contained in the air.

Here, as described above, since the electric charge device 60 is disposed outside the suction grill 16A, the amount of dust contacting the electric charge part 613 increases to increase an amount of the electrically charged dust particles.

The air suctioned through the suction part 16 passes through the filter device 30 before the air is heat exchanged with the indoor heat exchanger 41. In detail, the air passes through the air hole 314 of the filter housing 310 to pass between the plurality of arrays 331 constituting the filter. The plasma discharge occurs between the plurality of arrays 331. Also, the dust particles that are charged while the air passes through the plurality of arrays 331 may be attached onto the dielectric layer 333 of the array 331 to clean the air.

Also, the air passing through the filter 330 is heat exchanged with the indoor heat exchanger 41 and is discharged to the outside of the main body 10 through the discharge part 17.

In operation S4, a control unit (not shown) determines whether a cleaning condition of the filter 330 is satisfied while the air conditioning apparatus 1 operates.

In the current embodiment, the case in which the cleaning condition of the filter is satisfied may be a case in which the turn-on time of the air conditioning apparatus 10 reaches a reference time, a case in which the operation number of air conditioning apparatus 10 reaches a reference number, a case in which a pressure difference between the upstream side and the downstream side of the filter device 30 with respect to the flow direction of the air reaches a reference pressure, or a case in which a load of a motor for rotating the fan 42 reaches a reference load. For example, the pressure difference between the upstream side and the downstream side of the filter device 30 may be determined by pressure sensors (not shown) disposed at a suction part-side and a discharge part-side.

Here, the reference time or the reference number is variable. For example, since the amount of dust particles attached onto the filter 330 is large in dusty regions or countries, a cleaning cycle of the filter has to be shortened, and thus the reference time or reference number may be set to be short.

When the amount of dust particles attached onto the filter 330 increases, the dust particles act as flow resistance against the air. Here, as the amount of dust particles increases, the pressure difference between the upstream side and the downstream side of the filter device 30 gradually increases. Thus, when the pressure difference between the upstream side and the downstream side of the filter device 30 reaches a reference pressure, it may be determined that the cleaning condition of the filter 330 may be satisfied.

In operation S5, when the cleaning condition of the filter 330 is satisfied, the power source supply part 40 applies the high frequency voltage into the filter 330.

Although not limited, in the current embodiment, the low frequency voltage may be a voltage having a frequency of about 10 hz or less (a first frequency), and the high frequency voltage may be a voltage having a frequency of about 1 Khz or more (a second frequency).

When the high frequency voltage is applied into the filter 330, organic particles of the particles attached on the array 331 are burned, and inorganic particles are separated from the array 331 to allow the array 331 to perform self-cleaning.

The inorganic particles separated from the array 331 may fall into the dust storage part 50. Here, the fan 42 may be stopped while the filter 330 is cleaned, i.e., while the high frequency voltage is applied into the filter 330 so as to minimize a phenomenon in which the dust particles separated from the filter 330 are discharged from the main body 10 while the filter 330 is cleaned. However, when the fan 42 is stopped, information for notifying that the filter is under cleaning may be displayed on a display part (not shown).

Alternatively, while the filter 330 is cleaned, a rotation rate of the fan 42 may be reduced to the minimum reference rotation rate to allow the dust particles separated from the filter 330 to fall into the dust storage part 50. That is, in the present disclosure, a current rotation rate of the fan 42 may be reduced while the filter 330 is cleaned (fan stop included).

Also, in operation S6, the control unit determines whether the filter 330 is completely cleaned. For example, in the current embodiment, whether the cleaning of the filter 330 is completed may be determined according to whether a cleaning time of the filter (a time for which the high frequency voltage is applied into the filter) reaches a completion determination time.

If, when it is determined that the filter 330 is completely cleaned, the power source supply part may apply the low frequency voltage into the filter 330 again (returned to the operation S2).

According to the embodiments, since the electric charge part is disposed outside the main body, the amount of the charged dust may be maximized to maximize the air conditioning performance.

Also, since the dust particles are separated from the filter by the dielectric barrier discharge to collect the dust particles into the dust storage part without separating the filter from the main body to clean the filter by a user, the user convenience may be improved.

Also, since the dust particles separated from the filter are stored in the dust storage part, the discharge of the dust particles to the outside of the main body may be minimized.

FIG. 8 is a schematic view of an air conditioning apparatus according to another embodiment.

Referring to FIG. 8, in the current embodiment, although the electric charge device 60 is disposed outside the suction grill 16A, the voltage applying part 630A may be disposed outside the electric charge device 60. For example, the voltage applying part 630A may be disposed in the main body 10.

In the current embodiment, since the voltage applying part 630A is disposed outside the electric charge device 60, a degree of installation freedom of the electric charge device 60 may be improved.

Although the filter device cleans the air by the plasma discharge in the above embodiment, it is not limited thereto. For example, the filter device may include a dust collection plate connected to the ground electrode to collect the charge dust particles. However, in this case, the filter device may be cleaned manually by the user.

Although the filter is cleaned while the air conditioning apparatus operates in the above embodiment, it is not limited thereto. For example, when it is determined that the cleaning condition of the filter is satisfied while the air conditioning apparatus operates, the filter may be automatically cleaned after the operation of the air conditioning apparatus is completed.

Alternatively, when it is determined that the cleaning condition of the filter is satisfied while the air conditioning apparatus operates, the information for notifying that the filter needs to be cleaned is displayed on the display part after the operation of the air conditioning apparatus is completed. For example, when the user inputs a filter cleaning command by using a filter cleaning button, the filter cleaning may be performed.

Alternatively, it is determined whether the cleaning condition of the filter is satisfied after the operation of the air conditioning apparatus is completed, and then the filter may be automatically cleaned when the cleaning condition of the filter is satisfied.

Even though all the elements of the embodiments are coupled into one or operated in the combined state, the present disclosure is not limited to such an embodiment. That is, all the elements may be selectively combined with each other without departing the scope of the invention. Furthermore, when it is described that one comprises (or includes or has) some elements, it should be understood that it may comprise (or include or has) only those elements, or it may comprise (or include or have) other elements as well as those elements if there is no specific limitation. Unless otherwise specifically defined herein, all terms including technical or scientific terms are to be given meanings understood by those skilled in the art. Like terms defined in dictionaries, generally used terms needs to be construed as meaning used in technical contexts and are not construed as ideal or excessively formal meanings unless otherwise clearly defined herein.

Although embodiments have been described with reference to a number of illustrative embodiments thereof, it will be understood by those skilled in the art that various changes in form and details may be made therein without departing from the spirit and scope of the invention as defined by the appended claims. Therefore, the preferred embodiments should be considered in descriptive sense only and not for purposes of limitation, and also the technical scope of the invention is not limited to the embodiments. Furthermore, is defined not by the detailed description of the invention but by the appended claims, and all differences within the scope will be construed as being comprised in the present disclosure.

The invention claimed is:

1. Air conditioning apparatus comprising:
   a main body comprising a suction part through which air is suctioned and a discharge part through which the air suctioned through the suction part is discharged;
   an indoor heat exchanger disposed in the main body in which the air suctioned through the suction part is heat exchanged with a refrigerant;
   an electric charge device coupled to a suction grill defining the suction part outside the main body to charge dust in the air; and
   a filter device disposed between the suction part and the indoor heat exchanger in the main body to collect the charged dust particles;
   a discharge grill part for guiding discharge of the air that is heat exchanged with the refrigerant and supporting the indoor heat exchanger; and
   a dust storage part for collecting dust particles removed from the filter device coupled to the discharge grill part,
   wherein the filter device and the dust storage part are coupled to the indoor heat exchanger.

2. The air conditioning apparatus according to claim 1, wherein the electric charge device comprises:
   an electric charge part having at least one electrode;
   a base on which the electric charge part is seated, the base being coupled to the main body; and
   a cover for covering the base.

3. The air conditioning apparatus according to claim 2, wherein a position fixing part for fixing a position of the electric charge part is disposed on the base or the cover.

4. The air conditioning apparatus according to claim 2, wherein a voltage applying part for applying a voltage into the at least one electrode of the electric charge part is disposed between the base and the cover.

5. The air conditioning apparatus according to claim 4, wherein a wire through-hole through which a wire connected to the voltage applying part passes is defined in the base.

6. The air conditioning apparatus according to claim 4, wherein a seating guide for guiding a seated position of the voltage applying part is disposed on the base or the cover.

7. The air conditioning apparatus according to claim 2, further comprising a voltage applying part disposed in the main body to apply a voltage into the at least one electrode of the electric charge part.

8. The air conditioning apparatus according to claim 2, wherein a plurality of coupling parts coupled to the main body are disposed on the base.

9. The air conditioning apparatus according to claim 1, wherein the filter device comprises at least one conductive member for collecting the charged dust particles.

10. The air conditioning apparatus according to claim 9, wherein the at least one conductive member contacts a dielectric layer.

* * * * *